United States Patent
Sekiguchi

[11] Patent Number: 5,844,335
[45] Date of Patent: Dec. 1, 1998

[54] ELECTRIC MOTOR

[75] Inventor: Kazuhiro Sekiguchi, Saitama, Japan

[73] Assignees: Akebono Brake Industry Co. Ltd., Tokyo; Akebono Research and Development Centre, Ltd., Saitama, both of Japan

[21] Appl. No.: 831,008

[22] Filed: Mar. 31, 1997

[30] Foreign Application Priority Data

Apr. 4, 1996 [JP] Japan .................................. 8-082519

[51] Int. Cl.$^6$ ........................................ H02K 7/06
[52] U.S. Cl. ......................... 310/75 R; 310/80; 318/115
[58] Field of Search ............................ 310/75 R, 80, 310/273; 318/115

[56] References Cited

U.S. PATENT DOCUMENTS

| | | | |
|---|---|---|---|
| 2,978,621 | 4/1961 | Martinek | 310/75 R |
| 4,836,338 | 6/1989 | Taig | 188/72.1 |
| 5,000,295 | 3/1991 | Fargier | 188/72.1 |

Primary Examiner—Steven L. Stephan
Assistant Examiner—Judson H. Jones
Attorney, Agent, or Firm—Morgan, Lewis & Bockius LLP

[57] ABSTRACT

A light-weight and small-size electric motor in which linear movement can be obtained without requiring any special movement conversion mechanism. The electric motor includes a rotor (4), a rotary shaft (5, 6, 5a) coupled to the rotor (4), and a screw mechanism (7) for Supporting the rotary shaft (5, 6, 5a), the screw mechanism (7) being configured such that the rotor (4) is moved in an axial direction of the rotary shaft (5, 6, 5a) by movement of the rotary shaft (5, 6, 5a) within the screw mechanism (7) upon rotation of the rotor (4).

16 Claims, 2 Drawing Sheets

ELECTRIC MOTOR

BACKGROUND OF THE INVENTION

1. Field of the Invention

The present invention relates to an electric motor and, more particularly, to a light-weight and small-size electric motor having a structure in which a rotor portion of the electric motor moves linearly while rotating so that linear movement of the rotor can be obtained without requiring any special movement conversion mechanism.

2. Discussion of the Related Art

An electric motor has been used in various machines such as an actuator in a brake system and the like. Since an electric motor is a machine for generating a force of rotation, in general, when the electric motor is used to make an objective member move linearly, a movement conversion mechanism such is a ball screw, a cam mechanism or the like, must be provided between a rotary shaft of the motor and the objective member. See U.S. Pat. Nos. 4,836,338 and 5,000,295.

In an actuator of a brake system in which such a movement conversion mechanism as described above is interposed, however, problems arise that the size of the brake system as a whole increases corresponding to the interposition of the movement conversion mechanism. Also, the size of equipment in which the actuator is to be used increases, thereby making it difficult to reduce the size of tie brake system. A further problem arises in that as the number of parts increase, due to the necessity of necessity of including a movement conversion mechanism, the efficiency of conversion decreases.

SUMMARY OF THE INVENTION

Accordingly, the present invention is directed to an electronic motor that substantially obviates one or more of the problems due to limitations and disadvantages of the related art.

It is an object of the invention to provide an electric motor having a configuration in which a rotor portion of the motor moves linearly while the rotor is rotating to thereby solve the foregoing, problems.

In the electric motor, the rotor per se moves linearly while it is rotating so that there is no need to provide a conventionally-necessary special movement conversion mechanism for converting the rotation of a motor output shaft into linear movement. Further, the mechanism for making the rotor move linearly is extremely simplified and the number of parts can be largely reduced in comparison with the conventional motor. Consequently, the weight and size of the system can be reduced.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages, and in accordance with the purpose of the present invention, as embodied and broadly described, an electric motor comprises a rotor; a rotary shaft coupled to the rotor; and a screw mechanism for supporting the rotary shaft, the screw mechanism being configured such that the rotor is moved in an axial direction of the rotary shaft by movement of the rotary shaft within the screw mechanism upon rotation of the rotor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention. In the drawings.

DETAILED DESCRIPTION OF PREFERRED EMBODIMENTS

Figure 1:
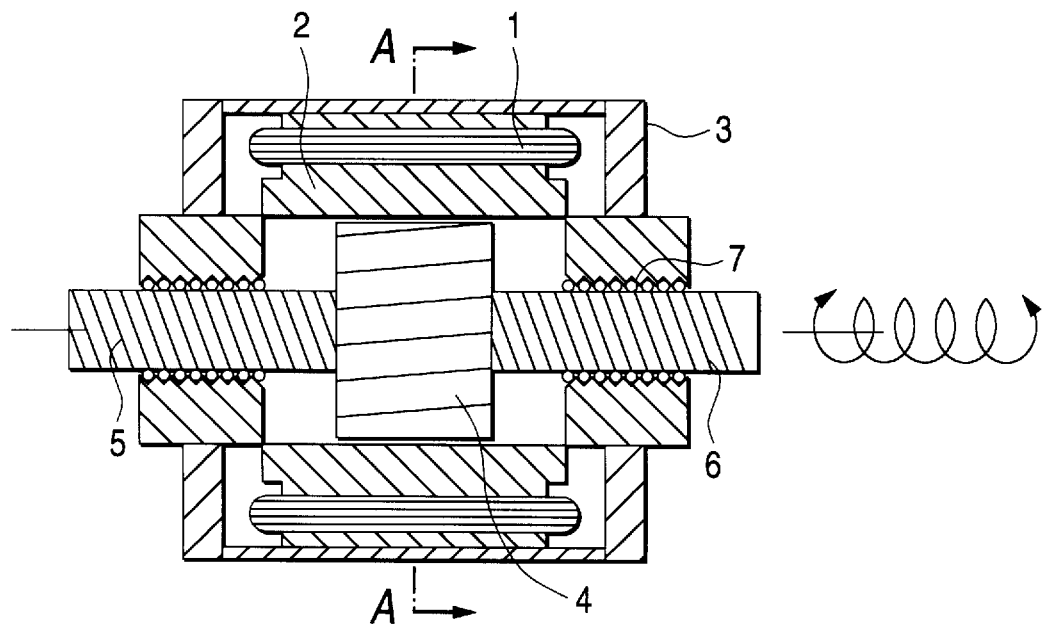
FIG. 1 is a sectional side view showing an electric motor according to a first embodiment of the present invention.
Figure 2:
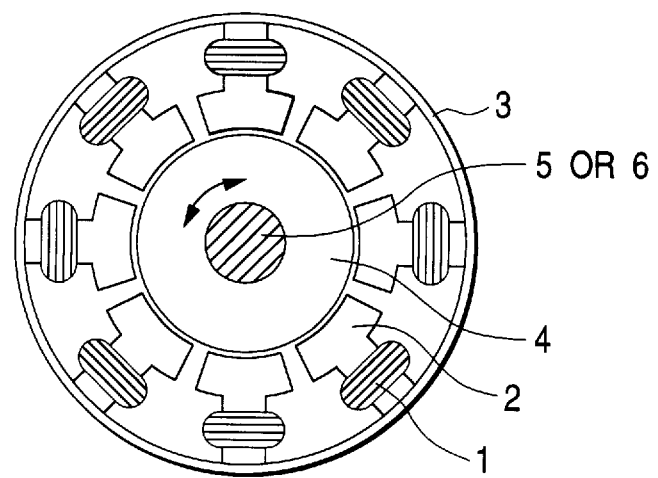
FIG. 2 is a sectional view of the electric motor in FIG. 1 taken on line A—A.

Reference will now be made in detail to preferred embodiments of the present invention, examples of which are illustrated in the accompanying drawings. In this regard, FIG. 1 is a sectional side view showing an electric motor according to a first embodiment of the invention. FIG. 2 is a sectional front view taken from line A—A in FIG. 1.

In the electric motor, a stator 2 provided with coil or coils 1 is fixed in a housing 3 and a rotor 4 is provided inside the stator 2. The stator 2 is formed to have an axial length slightly larger than that of the rotor 4 so that the rotor 4 does not project from the stator 2 when the rotor 4 moves linearly, as will be described later. First and second rotary shafts (rotary shaft portions) 5 and 6, respectively, are formed integrally with the rotor 4 on opposite sides or right and left sides of the rotor 4 in the drawing. The first and second rotary shaft portions 5 and 6 are each supported in the housing 3 by means of ball screw mechanism 7 such that the rotor 4 moves linearly by means of the ball screw mechanisms 7 when the rotor 4 rotates. Although ordinary screw mechanisms may be utilized in place of the foregoing ball screw mechanisms 7, it is preferable to use such ball screw mechanisms in view of the efficiency which they provide.

The operation of the thus-configured electric motor will now be described.

When a current flows into the coils 1 of the electric motor, the rotor 4 rotates to thereby generate rotational torque in accordance with well-known motor principles. When the rotor 4 rotates, its rotational torque is partially converted into an axial force by means of the ball screw mechanisms 7 so that the rotor 4 moves linearly while it is rotating. Thus, the rotor 4 moves right and left (in FIG. 1) with the movement of the rotary shafts 5 and 6 in the housing of the motor. Accordingly, the distance of axial movement of the rotary shaft is set in accordance with the distance of the right and left movement of the rotor 4. Thus, in this electric motor, the rotor 4 is moved linearly while it is rotating, and, therefore, it is not necessary to provide a conventional special movement conversion mechanism for converting rotation into linear movement. Accordingly, it is possible to reduce the size and weight of the whole actuator. Further, the number of parts may be reduced to thereby reduce the cost. Moreover, the direction of movement of the rotor 4 can be changed over by switching the direction of a current flowing in the electric motor.

Figure 3:
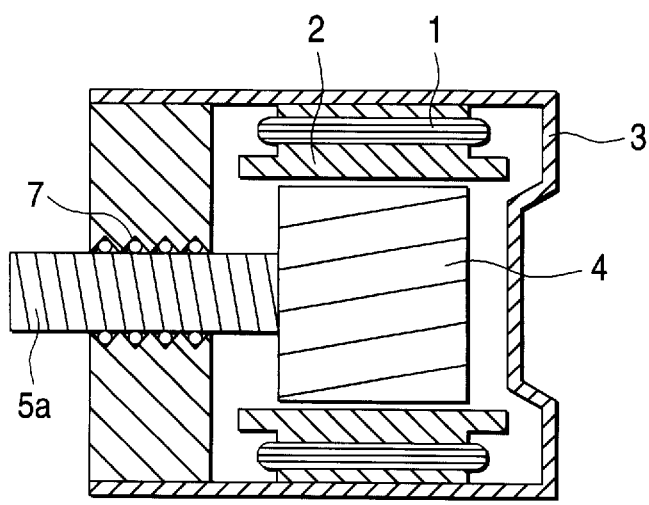
FIG. 3 is a sectional side view showing, an electric motor according to a second embodiment of the present invention.

Next, description will be made as to a second embodiment of the electric motor according to the present invention. FIG. 3 is a sectional side view showing the electric motor of the second embodiment. A feature of this electric motor is that a rotor 4 is supported like a cantilever in housing 3. In this embodiment, there is a space at a portion opposite to a supporting shaft (i.e., to the right in FIG. 3) so that it is possible to further reduce the system in size and weight.

In the electric motor of tie second embodiment, a stator 2, including a coil or coils 1, is fixed in a housing 3 and a rotor 4 is provided inside the stator 2. The stator 2 is formed so as to have a length slightly larger than that of the rotor 4 (as seen in FIG. 3) so that the rotor 4 does not project from the stator 2 when the rotor 4 moves linearly, as will be described later. A rotary shaft 5a is formed integrally with the rotor 4 so as to extend left from the rotor in the drawing and the rotary shaft 5a is supported in the housing 3 by means of a ball screw mechanism 7. Therefore, also in this electric motor, the rotor 4 is moved linearly by means of the ball screw mechanism 7 when the rotor 4 rotates.

The electric motor according to the present invention may be applied to an electrically-driven brake system such that a piston in a disk brake is connected to one of the first and second rotary shaft portions 5 and 6 in the case of the first embodiment or the piston is connected to the rotary shaft 5a in the case of the second embodiment. In either case, by controlling only the rotation of the electric motor by means of an electronic controller for controlling the brake system, it is possible to easily execute antilock control, traction control, automatic brake control, vehicle stability control, and the like.

Further, the electric motor according to the present invention can be used as an actuator (for example, a positioning mechanism, or the like), which requires linear movement variously.

Moreover, in the electric motor having the rotary shafts provided on the opposite sides, or right and left ends, of the rotor as illustrated in the first embodiment, two different movement modes can be realized by one electric motor. That is, one shaft portion may be utilized for performing linear movement while the other shaft portion may be utilized for performing rotation. For example, in an antilock brake system, one shaft portion of the electric motor is utilized to drive a piston in the brake system while the other shaft portion is utilized to drive a hydraulic pressure pump. Thus, the electric motor according to the present invention can be utilized in various systems in a variety of different ways.

As described in detail above, the following excellent effects can be obtained in accordance with the present invention:

1) Since a screw mechanism is used in the supporting portion for the rotor of the electric motor, the electric motor can be structured so that the rotor moves linearly while it is rotating and, therefore, it is possible to obtain a linear actuator which requires no special movement conversion mechanism; and 2) Since the rotor itself moves directly linearly, the number of parts and the size of the system can be reduced.

It will be apparent to those skilled in the art that various modifications and variations can be made in the electric motor of the present invention without departing from the spirit or scope of the invention. Thus, it is intended that the present invention cover the modifications and variations of this invention provided they come within the scope of the appended claims and their equivalents.

What is claimed is:

1. An electric motor comprising:
   a housing:
   a rotor accommodated in the housing;
   a rotary shaft fixed on the rotor and having a male screw; and
   a female screw mechanism affixed to the housing and engageable with the male screw of the rotary shaft;
   wherein the rotary shaft is moved in an axial direction of the rotary shaft upon rotation of the rotor so as to generate thrust.

2. The electric motor according to claim 1, wherein the rotary shaft comprises multiple rotary shaft portions provided on opposite side ends of the rotor.

3. The electric motor according to claim 1, wherein the rotary shaft is only provided on one side end of the rotor.

4. The electric motor according to claim 1, wherein the female screw mechanism comprises a ball screw mechanism.

5. The electric motor according to claim 1, wherein the rotary shaft is adapted to be coupled to an automobile disk brake piston.

6. The electric motor according to claim 1, wherein the rotary shaft comprises at least a first rotary shaft portion and a second rotary shaft portion, the first rotary shaft portion being coupled to perform linear movement, and the second rotary shaft portion being coupled to perform rotational movement.

7. The electric motor according to claim 6, wherein the first rotary shaft portion is adapted to be coupled to drive a piston in an antilock brake system and the second rotary shaft portion is adapted to be coupled to drive a hydraulic pressure pump.

8. A system including a vehicle having multiple wheels and an electric motor incorporated within a vehicle, the electric motor comprising:
   a housing:
   a rotor accommodated in the housing;
   a rotary shaft fixed on the rotor and having a male screw; and
   a female screw mechanism affixed to the housing and engageable with the male screw of the rotary shaft;
   wherein the rotary shaft is moved in an axial direction of the rotary shaft upon rotation of the rotor so as to generate thrust.

9. The system according to claim 8, wherein the rotary shaft comprises multiple rotary shaft portions provided on opposite side ends of the rotor.

10. The system according to claim 8, wherein the rotary shaft is only provided on one side end portion of the rotor.

11. The system according to claim 8, wherein the rotary shaft is adapted to be coupled to a disk brake piston of a vehicle.

12. The system according to claim 8, wherein the rotary shaft comprises at least a first rotary shaft portion and a second rotary shaft portion, the first rotary shaft portion being adapted to be coupled to perform linear movement, and the second rotary shaft portion being coupled to perform rotational movement.

13. The system according to claim 8, wherein the first rotary shaft portion is adapted to be coupled to drive a piston in an antilock brake system of a vehicle and the second rotary shaft portion is adapted to be coupled to drive a hydraulic pressure pump of a vehicle.

14. The system according to claim 8, wherein the movement of the rotary shaft includes rotational movement and the linear movement comprises bidirectional linear movement.

15. The system according to claim 8, wherein the electric motor is adapted to be coupled for use in at least one of an antilock control, traction control, automatic brake control, or vehicle stability control.

16. The system according to claim 8, wherein the female screw mechanism at least partially converts rotational torque of the rotor into an axial force causing the linear movement of the rotor.

\* \* \* \* \*